(12) United States Patent
O'Connor

(10) Patent No.: US 12,001,105 B2
(45) Date of Patent: Jun. 4, 2024

(54) SYSTEM AND METHOD FOR THE RIGHT-SIZING OF LCD SCREENS, SCREENS ADAPTED FOR DIVIDING INTO A PLURALITY OF CUSTOM SIZED SCREENS, AND RIGHT-SIZED SCREENS DERIVED THEREFROM

(71) Applicant: Declan Paul O'Connor, Boulder Creek, CA (US)

(72) Inventor: Declan Paul O'Connor, Boulder Creek, CA (US)

( * ) Notice: Subject to any disclaimer, the term of this patent is extended or adjusted under 35 U.S.C. 154(b) by 0 days.

(21) Appl. No.: 16/846,235

(22) Filed: Apr. 10, 2020

(65) Prior Publication Data
US 2020/0409200 A1     Dec. 31, 2020

Related U.S. Application Data

(60) Provisional application No. 62/832,843, filed on Apr. 11, 2019.

(51) Int. Cl.
*G02F 1/1345* (2006.01)
*G02F 1/1333* (2006.01)
*G02F 1/1339* (2006.01)

(52) U.S. Cl.
CPC .... *G02F 1/13452* (2013.01); *G02F 1/133351* (2013.01); *G02F 1/1339* (2013.01)

(58) Field of Classification Search
CPC ................ G02F 1/133351; G02F 1/13452
See application file for complete search history.

(56) References Cited

U.S. PATENT DOCUMENTS

| | | | |
|---|---|---|---|
| 2002/0005830 A1* | 1/2002 | Watanabe | G09G 3/3611 345/88 |
| 2009/0227167 A1* | 9/2009 | Tannas, Jr. | G02F 1/133308 445/2 |
| 2014/0092334 A1* | 4/2014 | Ishikawa | G02F 1/133512 445/25 |
| 2016/0204127 A1* | 7/2016 | Lee | H01L 27/1218 438/30 |

* cited by examiner

*Primary Examiner* — Lauren Nguyen
(74) *Attorney, Agent, or Firm* — Michael A. Guth

(57) ABSTRACT

A method for the making of a plurality of LCD screens starting with an oversize panel. The panels laid out on the mother glass include a plurality of screen layouts with trace lead-outs around all four sides of a rectangular panel layout. A panel is then made which has conductor traces around the periphery of the panel. The conductor traces may conductor pads on the panel. The panels are then able to be cut into up to four separate final screen panels depending upon the size requirements of the application. Each of the cut final screen panels will have trace contacts along adjacent edges to allow for coupling to flex connectors. As some panels will be left-right images of each other with regard to pixel colors, drivers for the panels will be adapted for RBG to GBR conversion to drive mirror image panels with the same images.

7 Claims, 9 Drawing Sheets ated panels. This results in significant waste.

SYSTEM AND METHOD FOR THE RIGHT-SIZING OF LCD SCREENS, SCREENS ADAPTED FOR DIVIDING INTO A PLURALITY OF CUSTOM SIZED SCREENS, AND RIGHT-SIZED SCREENS DERIVED THEREFROM

CROSS-REFERENCE TO RELATED APPLICATIONS

This application claims priority to U.S. Provisional Patent Application No. 62/832,843 to O'Connor, filed Apr. 11, 2019, which is hereby incorporated by reference in its entirety.

FIELD OF THE INVENTION

The present invention relates generally to electronic displays, and more particularly to a method for the creation of custom size displays using oversize starter panels.

BACKGROUND

A liquid crystal display (LCD) is a type of electrically generated image shown on a thin, flat, panel. The technology is based on electrically sensitive materials called liquid crystals, which flow like liquids but have a crystalline structure. Liquid crystals consist of molecules that organize themselves in the same direction but are still able to move about. Liquid crystal molecules respond to an electrical voltage, which changes their orientation and alters the optical characteristics of the bulk material.

Conventional LCDs are available in standard sizes that may not fit some intended applications. Methods are known in the art for resizing LCDs to meet non-standard configuration needs. The re-sizing of LCDs may involve the cutting off of an undesired excess portion of a larger electronic display and then resealing the cut edges of the display. Typically, the re-sized LCDs have already been coupled to external leads to which electronic drivers are attached. The re-sizing of LCDs, such as seen in U.S. Pat. No. 7,535,547, to Tannas, involves the cutting of the commercial off the shelf display to reduce its physical size. The originally sized screen had row and column electric leads, typically along two adjacent sides, extending from a seal which holds upper and lower plates together. The extending leads, which may ultimately route to driver electronics via a flexible substrate, typically fan in into a landing area in order to be joined to a series of distinct flexible substrates. For example, every 50 rows of column leads may fan in at the border of the display in order to couple to a series of distinct flexible substrates along a side of the screen. Similarly, every 50 rows of row leads may fan in at the border of the display in order to couple to a series of distinct flexible substrates along an adjacent side of the screen. When re-sizing a screen, the original leads coupled to the distinct flexible substrates, or other coupling portion, are retained for the portion of the screen which is retained.

The undesired, excess, portion of the screen, which may also be referred to as a remnant portion, has no such external leads coupled to it, nor does it have a fan in portion at its periphery. Previously, such remnants have been discarded. This results in significant waste.

What is needed is a method to allow for the manufacture of an oversize, generic, screen which then can be cut into smaller screens. The oversize screen may have leads around its entire periphery, allowing for four corners to be used as the basis for four subsequent screens. Such a method would allow for the use of pieces of a generic, oversize, screen which could be cut to a desired shape and then processed into a functioning display

SUMMARY OF THE INVENTION

Figure 1:
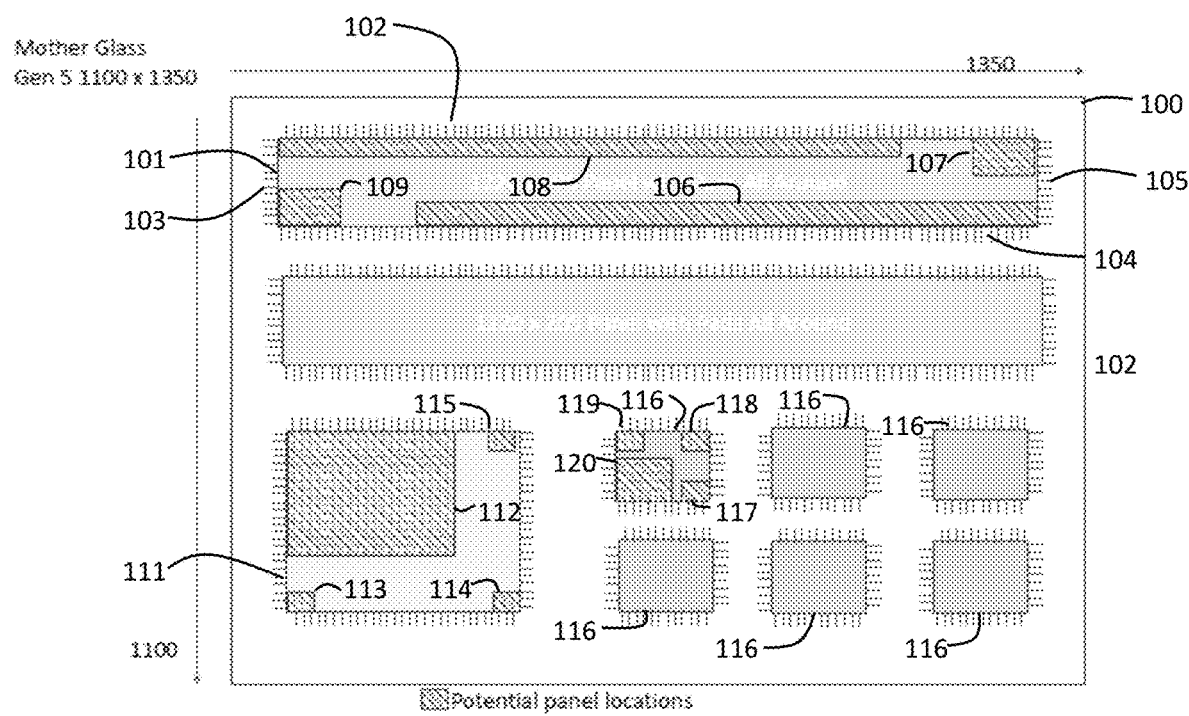
FIG. 1 is a view of a master panel layout according to some embodiments of the present invention.

A method for the making of a plurality of LCD screens starting with an oversize panel. The panels laid out on the mother glass include a plurality of screen layouts with trace lead-outs around all four sides of a rectangular panel layout. A panel is then made which has conductor traces around the periphery of the panel. The conductor traces may conductor pads on the panel. The panels are then able to be cut into up to four separate final screen panels depending upon the size requirements of the application. Each of the cut final screen panels will have trace contacts along adjacent edges to allow for coupling to flex connectors. As some panels will be left-right images of each other with regard to pixel colors, drivers for the panels will be adapted for RBG to GBR conversion to drive mirror image panels with the same images.

DETAILED DESCRIPTION

In typical applications, an LCD panel is fabricated with a specific pre-determined end-use size for the panel in mind. When a manufacturer of LCD panels fabricates the larger master panels, the entire panel may be destined to be used as one large panel, such as the case of the large screen television. In another case, the master panel may be laid out such that there are a number of panels laid out within in it. For example, there may a set of single composite processes performed on the master glass pieces, such as indium tin oxide laydown, masking, etching, etc., as well as color laydown of the top glass, that result in a number of panels that are available to be cut from the master panel. Even in these cases, though, the sizes of the panels are determined in advance to meet an identified need. The pre-sized panels may be cut down to size, and then further the top glass may be trimmed back to expose conductive traces, which may have been laid down coupled to attachment pads.

It costs a great deal of non-recurring engineering cost and setup cost to start manufacturing a panel of a new size. A re-sizing industry has been developed, which takes already fabricated LCD modules and trims away a portion of the panel on a side away from the driver attachment. The trimmed panel is then sealed around its trimmed periphery and the re-sized panel may become part of a new, smaller, LCD module. The trimmed out portion is viewed as excess and is typically discarded. Although this may seem like an inefficient approach to manufacturing a smaller, custom re-sized panel, it may be significantly less expensive than the non-recurring costs that would be incurred should a master panel be laid out to make the smaller custom sized panels in the first instance.

In some embodiments of the present invention, LCD panels adapted for later right-sizing are manufactured. A master panel may include layouts for panels with row and column traces extending around all sides of the inset panels, allowing for the panels cut from the master glass to support later right-sizing wherein the trimmed pieces are not scrapped but are able to be used to make further panels. In contrast to re-sizing, wherein a panel module had already been fabricated prior to panel trimming, with right-sizing of the panels the panels are trimmed after an LCD panel has been manufactured, but prior to the attachment of flex cables or drivers. The trimmed panels may be sealed in a manner similar to panels that have been re-sized along their trimmed edges. As some of the right-sized panels may be from opposite corners of the initial panel that was adapted for right-sizing, the red-blue-green order may be reversed for some panels. The driver and control electronics are also adapted to adjust to this circumstance and properly display the desired images. Also discussed herein with regard to LCD TFT panels, in some aspects the panels may be OLED panels or other panel types.

In some embodiments of the present invention, LCD panels are manufactured to allow for subsequent right-sizing of the panel into two or more panels which have trace contact borders adapted for coupling to flex connectors. In an exemplary case, a commercial off the shelf display has a front and a back plate, and pluralities of row and column electrical leads traversing through an image generating medium area contained between the plates. A perimeter seal both holds the plates together and isolates the image generating medium from the outside environment. The row and column leads extend beyond the seal, and may fan-in to prepared landings adapted for bonding of TABs which may electrically couple the row and column leads to driver circuitry. When a LCD has been re-sized to a new smaller size, the remaining portion, or remnant portion, previously was typically discarded. In some embodiments of the present invention, a large, variable end-use, panel is produced which allows for the right-sizing of the large panel and then the use of the remaining portion of the panel. The right-sizing of the panel may occur without first having attached drivers or flex cables to the panel. In some embodiments, a large panel may be right-sized into two smaller screens. In some embodiments, a large panel may be right-sized into three smaller screens. In some embodiments, a large panel may be right-sized into four smaller screens. The production of a large, variable sized end-use panel allows for the production of a large panel that can be sized into a variety of different sized smaller screens. The large, variable sized end-use panel allows for the determination of the size needed for a particular application to be made after the manufacture of the large panel, and then for that application to be cut from the panel. The remaining portion of the panel is adapted to be used for up to three more screens which will already have row and column conductor traces available and adapted for subsequent use on the additional screens.

In some embodiments of the present invention, as seen in FIG. 1, a master panel 100 has a plurality of smaller panel layouts 102, 105, 111, 116 within its periphery. The smaller panel layouts are illustrative of potential panel layouts that could be constructed within a large mother glass. A smaller layout 101 has row conductor traces 103, 105 extending past both sides of the panel area 101. The column traces 102, 104 extend past both the top and bottom of the panel area 101. Four potential smaller panels 106, 107, 108, 109 are seen and are located nested into each of the four corners. Should panels of different sizes be desired, the originally sized layout 101 may be further sized downward into the four smaller panels 106, 107, 108, 109, for example. Each of these four smaller panels would be able to be constructed into a finished LCD screen and module, as each would have available traces on adjacent sides which could be coupled to screen drivers. The various panels within the master panel may have leads extending from all four sides of the panels. In some aspects, the leads around all four sides of the panels within the master panel may have bonding pads on the leads to allow for TAB bonding. In some aspects, the leads around all four sides may be fanned in at certain intervals to allow for clearance between a plurality of flexible cables bonded to the bonding pads. In some aspects, the fanned in sections allow for trimming of the panel length and width at positions adapted to receive flexible cables of a known width.

A second smaller panel layout 111 is similarly seen with traces extending past the periphery of all four sides of the panel area. Four potential smaller panels 112, 113, 114, 115 are seen and are located nested into each of the four corners. Each of these four smaller panels would be able to be constructed into a finished LCD screen, as each would have available traces with bonding pads on adjacent sides which could be coupled to screen drivers.

A plurality of third smaller panel layouts 116 are seen with traces extending past the periphery of the panel area. Four potential smaller panels 117, 118, 119, 120 are seen and are located nested into each of the four corners. Each of these four smaller panels would be able to be constructed into a finished LCD screen, as each would have available traces on adjacent sides which could be coupled to screen drivers.

Figure 2:
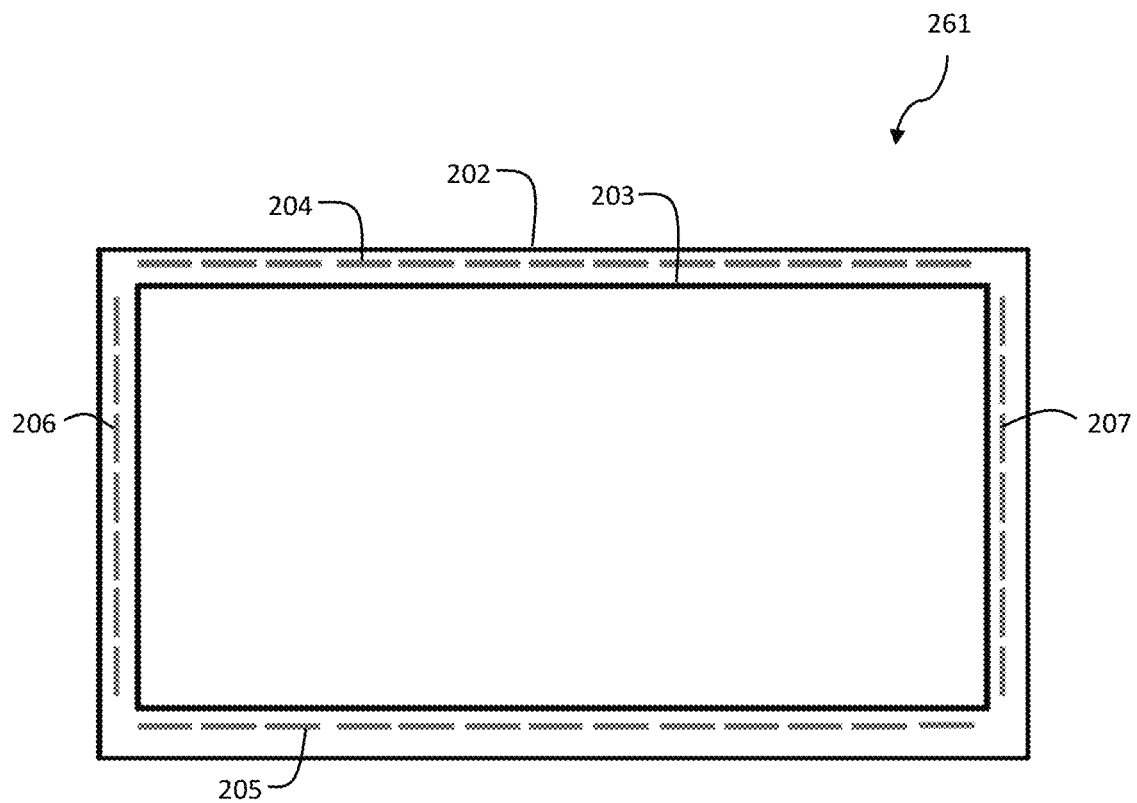
FIG. 2 is a view of a panel according to some embodiments of the present invention.

In some embodiments of the present invention, as seen in FIG. 2, a variable sized end-use panel 261 is seen with row leads 206, 207 extending out along both sides of the screen area 203. The column traces 204, 205 similarly extend past the screen area 203 both above and below the screen area. The rear glass 202 may extend past the screen area 203 to support the row and column traces. The end-use panel may be a panel cut from a master panel 100, or may be a panel fabricated as a single panel. In this illustrative embodiment, the row and column traces 204, 205, 206, 207 are fanned in along the periphery and present themselves as separate groups of traces. In some aspects, the row and column traces may be fanned in and may also be coupled to pads to more readily support electric coupling of the traces to conductors, such as flexible cables coupled with TAB processes. In some aspects, the fan in areas 204, 205, 206, 207 may be sized small enough that subsequent panel cutting may be sized such that the subsequent cutting does not need to cut through an area of pads, but instead in an area between fan in areas so that leads are not damaged. In this illustrative embodiment, the variable sized end-use panel 261 is a panel which has been otherwise manufactured in accord with mostly known in the art techniques, with a cover top glass 203 which has been trimmed to a smaller size than the back glass 202 to allow access to lead traces around the complete periphery of the panel.

Figure 3:
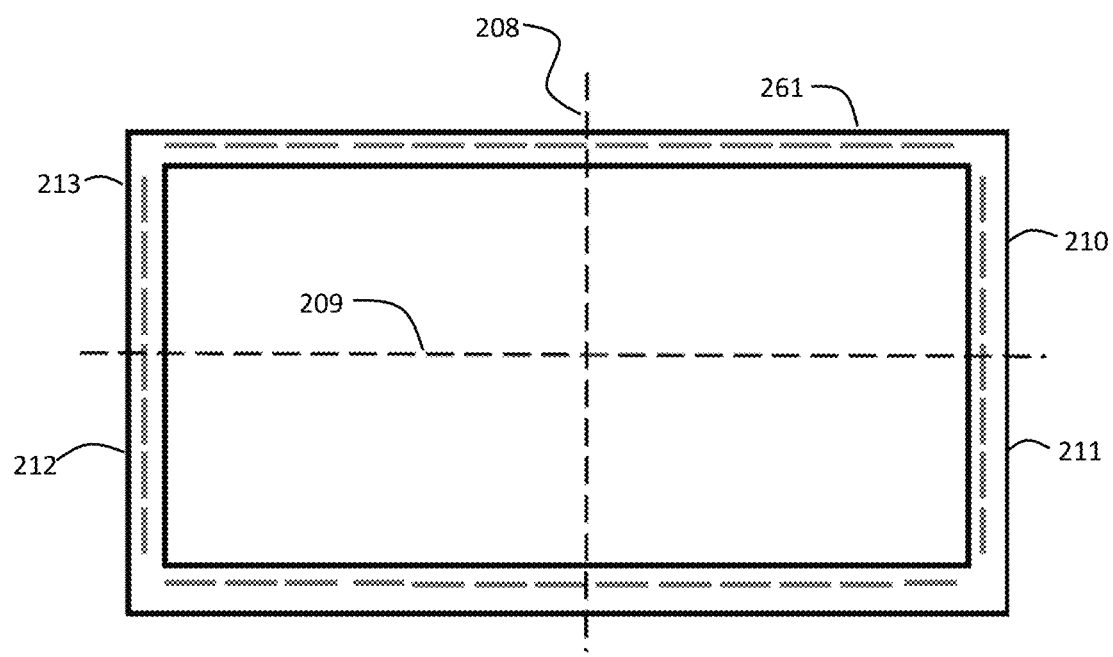
FIG. 3 is a view of a panel with potential cut lines according to some embodiments of the present invention.
Figure 4:
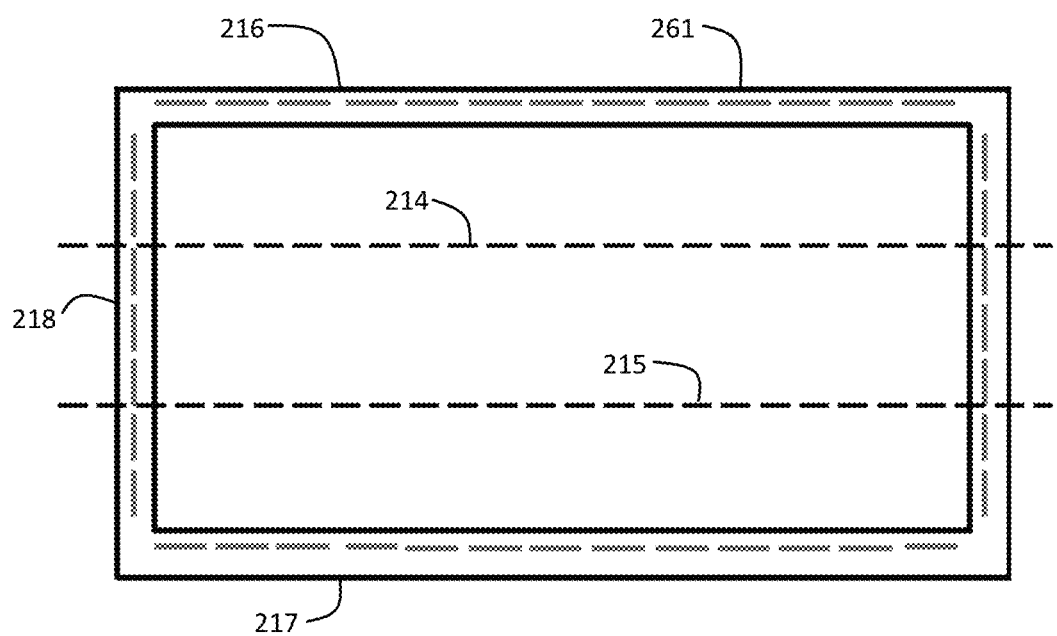
FIG. 4 is a view of a panel with potential cut lines according to some embodiments of the present invention.

FIGS. 3 and 4 illustrate two possible scenarios for utilizing the variable sized end-use panel 261. The right-sizing of panels according to embodiments of the present invention may involve cutting within the previously sealed perimeters of a fabricated panel, though the panel has not already been further incorporated into an LCD module. In contrast, resizing of panels involves the cutting of an already fabricated LCD module. In the illustrative example of FIG. 3, the panel 261 may be cut along a horizontal line 209, and also along a vertical line 208. This results in four similarly sized cut panels 210, 211, 212, 213. The cut right-sized panels 210, 211, 212, 213 each have row and column traces extending past the front glass that are accessible for further processing of the panel into an LCD module. The cut edges of the right-sized panels are sealed using techniques currently used in re-sizing operations for LCD panels. In contrast to resized panels, which typically start with a complete LCD module which is then cut down and with the cut portion of the panel disposed of as excess, each of the cut panels 210, 211, 212, 213 has accessible and available traces, which may also have fan in areas and bonding pads. Using panels from the upper right corner 210 and the lower left corner 212 as an example, if the upper right corner panel 210 is rotated 180 degrees in plane the red-blue-green (RBG) aspect of the panel would be reversed to GBR. This cutting of a larger panel 261 into smaller panels allows a user to utilize a single sized panel to support the manufacture of a plurality of LCD modules, whose size could be determined, as needed, after the fabrication of the initial panel 261.

In the illustrative example of FIG. 4, the panel 261 may be cut along a first horizontal line 214, and also along a second line 215. This results in two similarly sized cut panels 216, 217. An excess panel area 218 may be left over from this operation. The cut right-sized panels 216, 217 each have row and column traces extending past the front glass that are accessible for further processing of the panel into an LCD module. Although illustrated in FIG. 4 as two panels and an excess area, in another circumstance a single horizontal cut may be made, resulting in two panels which have a larger vertical dimension than as seen with the excess panel area example. In this way, the panel 261 may be utilized to support a variety of right-sized panels and panel modules whose dimensions may be determined after the manufacture of the original panel 261, each having leads extending out. The leads may have bonding pads allowing for easier, quicker, and more reliable attachment of flex cables or other items, as discussed herein. In some aspects, the leads are also fanned in into groups of leads allowing for spacing between the groups of leads. The spacing between the groups of leads allows for selection of a cut line location which does not impinge upon padded fan in lead areas.

Figure 5:
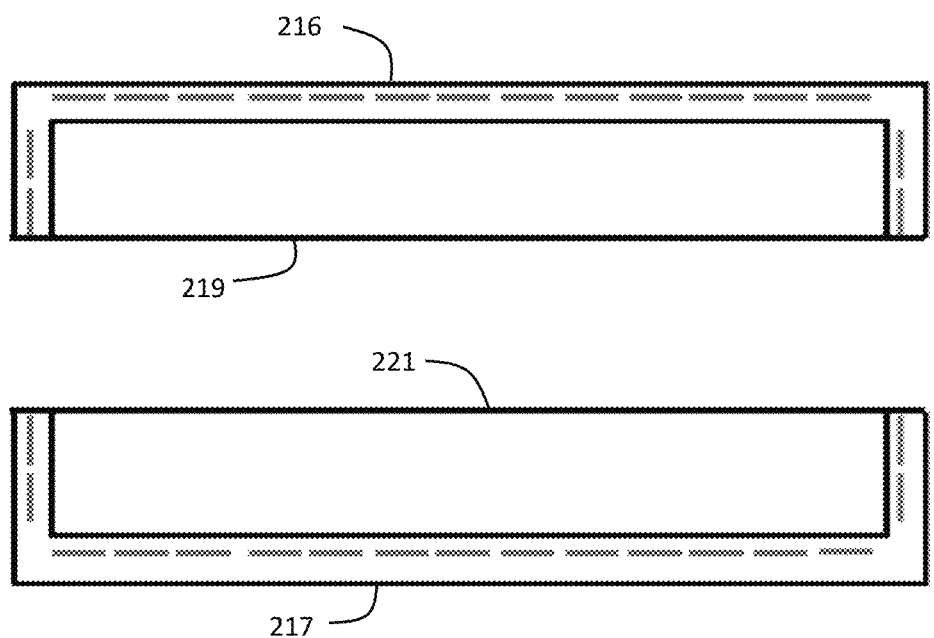
FIG. 5 is a view of cut panel portions according to some embodiments of the present invention.

In some embodiment of the present invention, as seen in FIG. 5, the cut panels 216, 217 are seen with their cut edges 219, 221. The cut edges of the right-sized panels are sealed using techniques currently used in re-sizing operations for LCD panels. In contrast to resized panels, which typically start with a complete LCD module which is then cut down and with the cut portion of the panel disposed of as excess, each of the cut panels 216, 217 has accessible and available traces, which may also have fan in areas and bonding pads.

Figure 6:
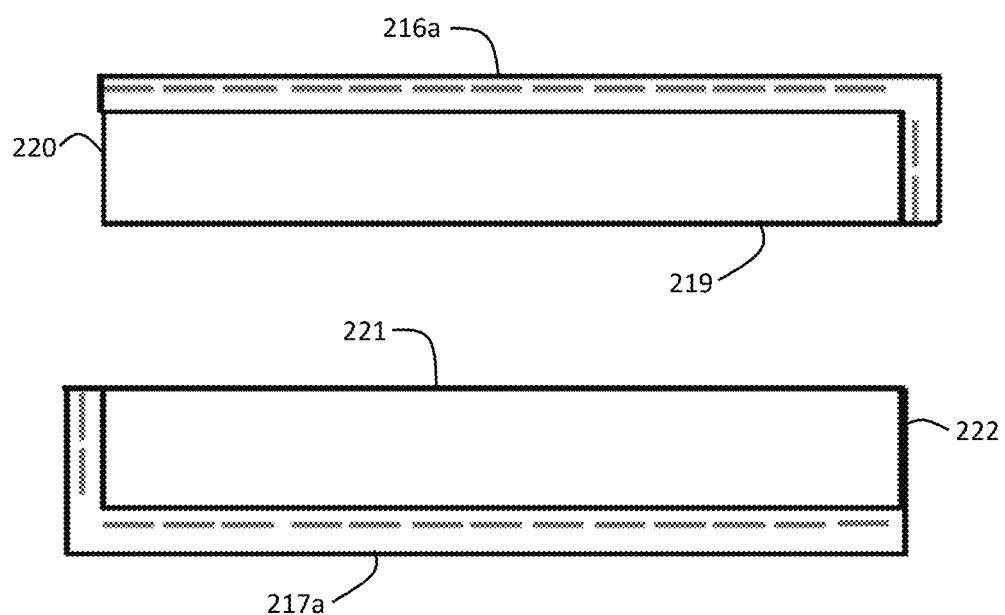
FIG. 6 is a view of trimmed panel portions according to some embodiments of the present invention.

FIG. 6 illustrates a next step in the manufacturing of a right-sized panel according to some embodiments of the present invention. At this step in the process, the excess edges have been trimmed off to leave cut edges 220, 221. The upper trimmed panel 216*a* has two trimmed edges 219, 220 which are sealed using techniques known in the art. The lower trimmed panel 217*a* has two trimmed edges 221, 222 which are sealed using techniques known in the art. The resulting panels 216*a*, 217*a* have the same external configuration and may both be used to address the same sizing need for a completed LCD module. However, the RBG order of the column traces of the first trimmed panel 216*a* will be reversed compared to the second trimmed panel 217*a*.

Figure 7:
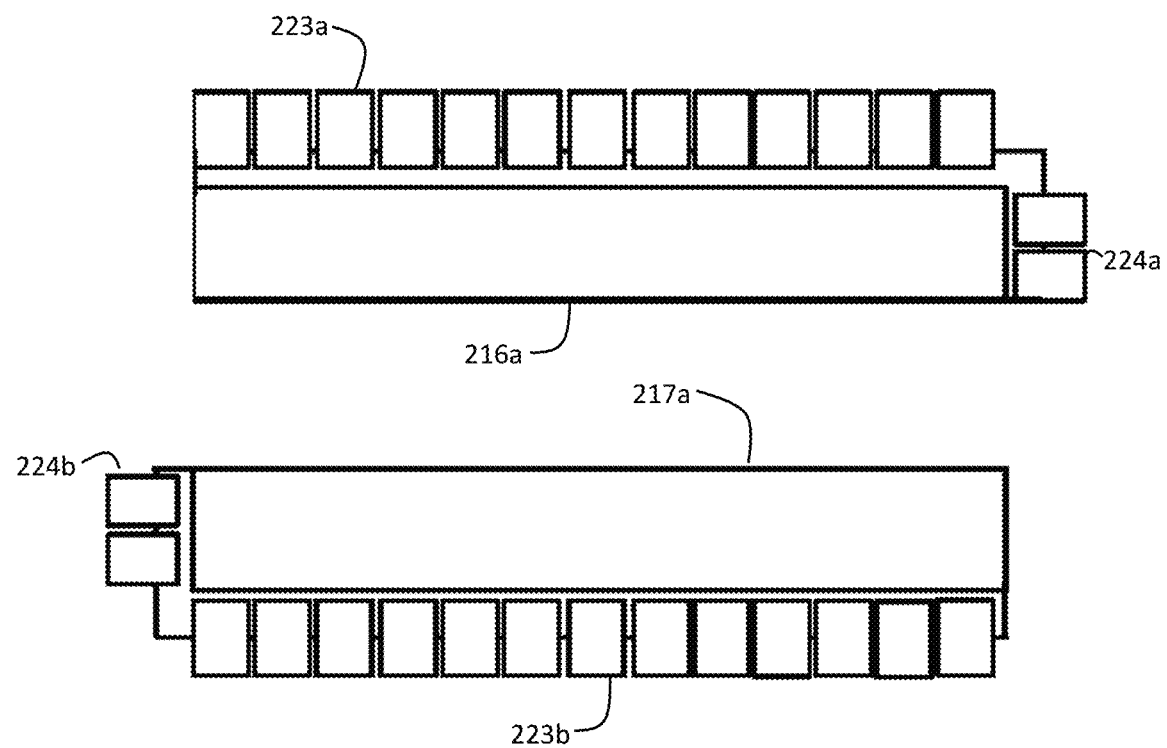
FIG. 7 is a view of trimmed panel portions with flex cables attached according to some embodiments of the present invention.

FIG. 7 illustrates a further step in the manufacture of right-sized LCD panels according to some embodiments of the present invention. A plurality of column flex cables 223*a* have been coupled to the upper trimmed panel 216*a*. The column flex cables 223*a* are electrically coupled to the column traces 204, which may be fanned in to attachment pads. The column flex cables 223*a* may also be structurally coupled to the panel 216*a*. A plurality of row flex cables 224*a* have been coupled to the panel portion 216*a*. The row flex cables 224*a* are electrically coupled to the row traces 207, which may be fanned in to attachment pads. The row flex cables 224*a* may also be structurally coupled to the panel 216*a*. Similarly, a plurality of column flex cables 223*b* have been coupled to the lower trimmed panel 217*a*. The column flex cables 223*b* are electrically coupled to the column traces 205, which may be fanned in to attachment pads. The column flex cables 223*b* may also be structurally coupled to the panel 217*a*. A plurality of row flex cables 224*b* have been coupled to the panel portion 217*a*. The row flex cables 224*a* are electrically coupled to the row traces 206, which may be fanned in to attachment pads. The row flex cables 224*b* may also be structurally coupled to the panel 217*a*. The flex cables may be coupled to the panels using TAB bonding techniques known in the art.

Figure 9:
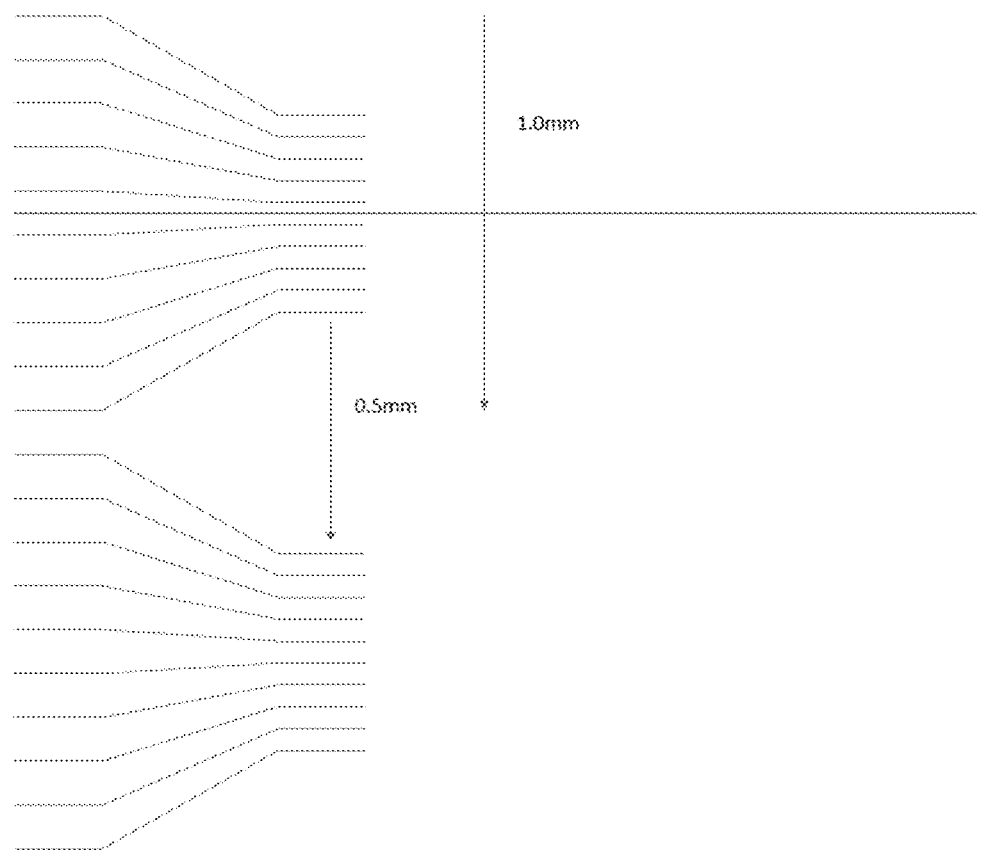
FIG. 9 illustrates a fan in pattern according to some embodiments of the present invention.

Although illustrated as relatively large fanned in areas which would encompass a large number of traces, in some aspects smaller groups of traces may be fanned in to smaller bonding areas, as illustrated in FIG. 9. In this illustrative example, groupings of traces which span 1 mm are fanned in to areas which span 0.5 mm. In some aspects, larger groups of traces are fanned in together. In some aspects, the fanned in traces would have enlarged bonding pads which facilitate coupling to the flex cables, or other conductor types.

Figure 8:
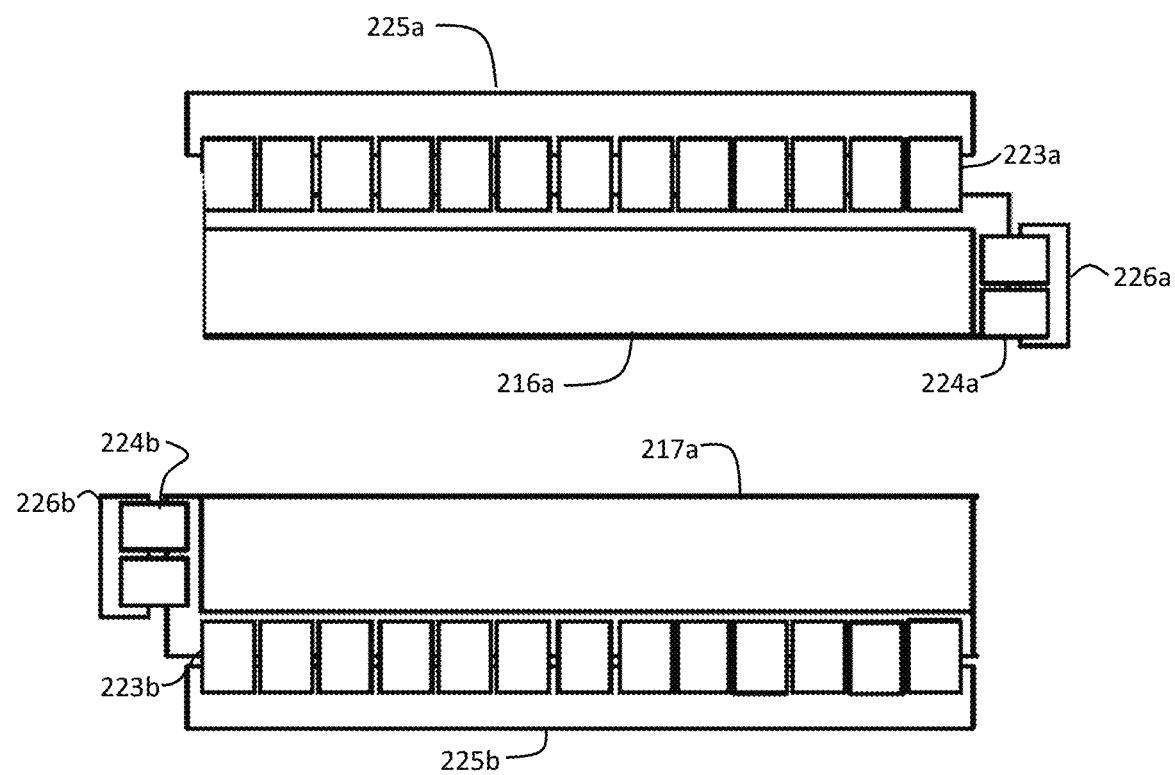
FIG. 8 is a view of trimmed panel portions with flex cables and drives attached according to some embodiments of the present invention.

FIG. 8 illustrates a further step in the manufacture of right-sized panels according to some embodiments of the present invention. The upper panel 216*a* has column drivers 225*a* coupled to a second end of the column flex cables 223*a*. Row drivers 226*a* are coupled to a second end of the row flex cables 224*a*. The lower panel 217*a* has column drivers 225*b* coupled to a second end of the column flex cables 223*b*. Row drivers 226*b* are coupled to a second end of the row flex cables 224*b*.

The RBG order of the column traces of the first trimmed panel 216*a* will be reversed compared to the second trimmed panel 217*a*. In some aspects, the drivers are adapted to accommodate this reversed color order and to display proper images. The drivers of an upper panel may scan such that the RGB pattern is reversed.

Embodiments according to the present invention allow for panels to fabricated as panels, although not into LCD modules, and then to be further sized to the needs of a particular end use application. This may obviate the need to incur the startup costs of laying out panels when new configuration size needs arise. Further, a master panel may be designed once and then that layout may be used to support a large number of end uses of different sizes. The smaller panels cut from the master panel which are adapted to be subsequently right-sized further allow for modifications of end use configurations while maximizing the efficient use of the previously fabricated panels.

As evident from the above description, a wide variety of embodiments may be configured from the description given herein and additional advantages and modifications will readily occur to those skilled in the art. The invention in its broader aspects is, therefore, not limited to the specific details and illustrative examples shown and described. Accordingly, departures from such details may be made without departing from the spirit or scope of the applicant's general invention.

What is claimed is:

1. A method for the right-sizing of LCD screens, the method comprising the steps of:
   fabricating a first LCD panel, said first LCD panel comprising:
      a first, second, third, and fourth side;
      a front glass; and
      a screen area, said screen area residing within said first, second, third, and fourth side of said LCD panel wherein the third side is opposite to the first side, and the fourth side is opposite to the second side,
      wherein each of said first and third sides comprise row leads extending past said front glass, and wherein each of said second and fourth sides comprise column leads extending past said front glass, and wherein said row leads and said column leads fan in in an area outside of an area covered by said front glass, and wherein conductive bonding pads are coupled to each of said row leads and said column leads in said area outside of an area covered by said front glass, and wherein said first LCD panel has not previously had drivers or flex cables attached to said first LCD panel; and
   cutting said first LCD panel into a plurality of smaller right-sized LCD panels after the step of fabricating the first LCD panel, said cutting said first LCD panel comprising cutting through said front glass and said screen area, each of said plurality of smaller right-sized LCD panels comprising at least one edge with row leads extending past the front glass and at least one edge with column leads extending past the front glass and at least one edge comprising cut front glass.

2. The method of claim 1 further comprising the step of sealing the cut edges comprising cut front glass of one or more of said plurality of smaller right-sized LCD panels.

3. The method of claim 2 further comprising the step of coupling conductors to the column and row leads of said one or more of said plurality of said smaller right-sized LCD panels.

4. The method of claim 3 further comprising the step of coupling row and column drivers to the row and column leads of said one or more of said plurality of said smaller right-sized LCD panels.

5. The method of claim 4 wherein some or all of said row and column drivers are adapted to drive panels with their RBG order reversed.

6. The method of claim 1 wherein said row leads and said column leads extending past said front glass are fanned in at intervals to allow for clearance between said fanned in areas.

7. The method of claim 6 further comprising the step of sealing the cut edges comprising cut front glass of one or more of said plurality of smaller right-sized LCD panels.

* * * * *